(12) United States Patent
Wang et al.

(10) Patent No.: US 11,754,884 B2
(45) Date of Patent: Sep. 12, 2023

(54) LIQUID CRYSTAL DISPLAY PANEL AND METHOD FOR MANUFACTURING SAME

(71) Applicant: Century Technology (Shenzhen) Corporation Limited, Shenzhen (CN)

(72) Inventors: Hui Wang, Shenzhen (CN); Zheng-Xia He, Shenzhen (CN); Yuan Xiong, Shenzhen (CN); Ning Fang, Shenzhen (CN); Chih-Chung Liu, New Taipei (TW); Meng-Chieh Tai, New Taipei (TW)

(73) Assignee: Century Technology (Shenzhen) Corporation Limited, Shenzhen (CN)

( * ) Notice: Subject to any disclaimer, the term of this patent is extended or adjusted under 35 U.S.C. 154(b) by 0 days.

(21) Appl. No.: 17/380,351

(22) Filed: Jul. 20, 2021

(65) Prior Publication Data

US 2022/0057662 A1  Feb. 24, 2022

(30) Foreign Application Priority Data

Aug. 24, 2020 (CN) .......................... 202010859304.9

(51) Int. Cl.
*G02F 1/1339* (2006.01)
*G02F 1/1335* (2006.01)

(52) U.S. Cl.
CPC ...... *G02F 1/1339* (2013.01); *G02F 1/133516* (2013.01)

(58) Field of Classification Search
CPC . G02F 1/1339; G02F 1/1341; G02F 1/133516
USPC ........................................................ 349/153
See application file for complete search history.

(56) References Cited

U.S. PATENT DOCUMENTS

| | | | |
|---|---|---|---|
| 6,204,906 B1* | 3/2001 | Tannas, Jr. | ........ G02F 1/133308 349/190 |
| 2009/0004944 A1* | 1/2009 | Tannas, Jr. | ............ G02F 1/1309 445/2 |
| 2010/0208188 A1* | 8/2010 | Tsai | .................... H01L 51/5246 257/E27.111 |

* cited by examiner

*Primary Examiner* — Edward J Glick
*Assistant Examiner* — David Y Chung
(74) *Attorney, Agent, or Firm* — ScienBiziP, P.C.

(57) ABSTRACT

A method for fast and convenient manufacture of liquid crystal display panels of different and uncommon sizes without retooling provides a first liquid crystal display panel having a first display area of a large first size. The color filter substrate is cut to make the first liquid crystal display panel into a vacuum-broken state. A sealant is coated onto the array substrate, wherein the sealant seals the liquid crystal layer and extends to a side of the color filter substrate away from the array substrate to cover part of the first display area, thereby obtaining a second liquid crystal display panel with a second display area of a second size.

11 Claims, 10 Drawing Sheets

LIQUID CRYSTAL DISPLAY PANEL AND METHOD FOR MANUFACTURING SAME

FIELD

The subject matter herein generally relates to the technical field of displays, specifically a liquid crystal display panel and a method of manufacturing the liquid crystal display panel.

BACKGROUND

Liquid crystal display (LCD) panels with large display sizes such as 4:3 or 16:9 are common. If the liquid crystal display panels with uncommon display sizes such as 4:1 or 16:3 are required, a mask needs to be redesigned and the manufacturing process re-developed for a new product line, which may be labor intensive, time consuming, and high cost.

Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". The term "circuit" is defined as an integrated circuit (IC) with a plurality of electric elements, such as capacitors, resistors, amplifiers, and the like.

Figure 1:
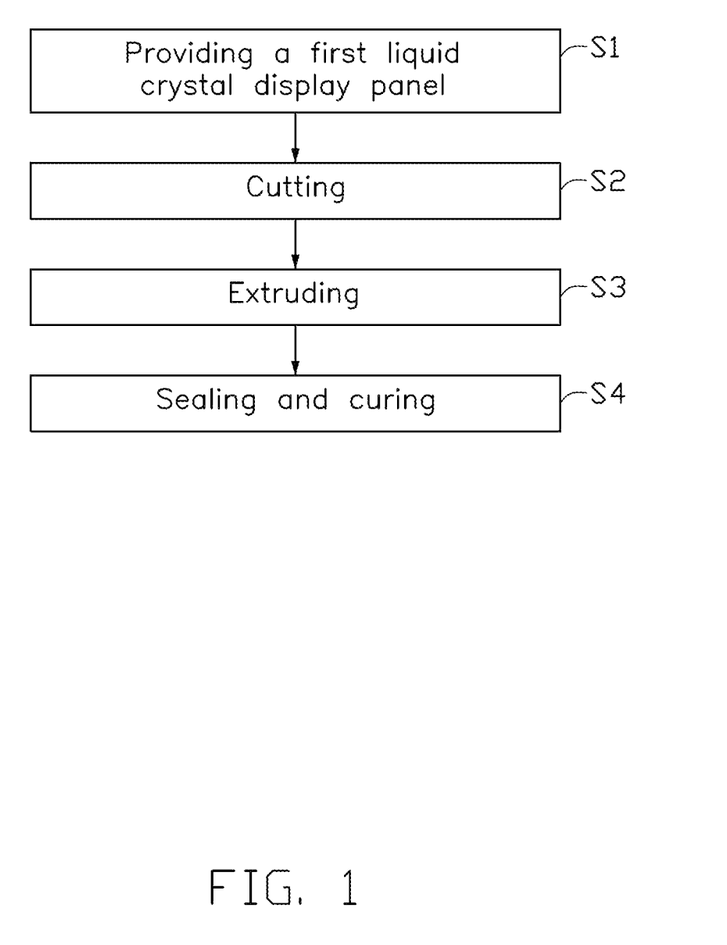
FIG. 1 is a flowchart of a method of manufacturing a liquid crystal display panel according to an embodiment of the present disclosure.

FIG. 1 is a flowchart of a method of manufacturing a liquid crystal display panel according to an embodiment of the present disclosure. The example method is provided by way of example, as there are a variety of ways to carry out the method. The method described below can be carried out using the configurations illustrated in FIGS. 2 through 10, for example, and various elements of these figures are referenced in explaining the example method. Each block shown in FIG. 1 represents one or more processes, methods, or subroutines carried out in the example method. Furthermore, the illustrated order of blocks is by example only, and the order of the blocks can be changed. Additional blocks can be added, or fewer blocks can be utilized, without departing from this disclosure. The example method can begin at block S1.

In Block S1, a first liquid crystal display panel is provided.

Figure 2:
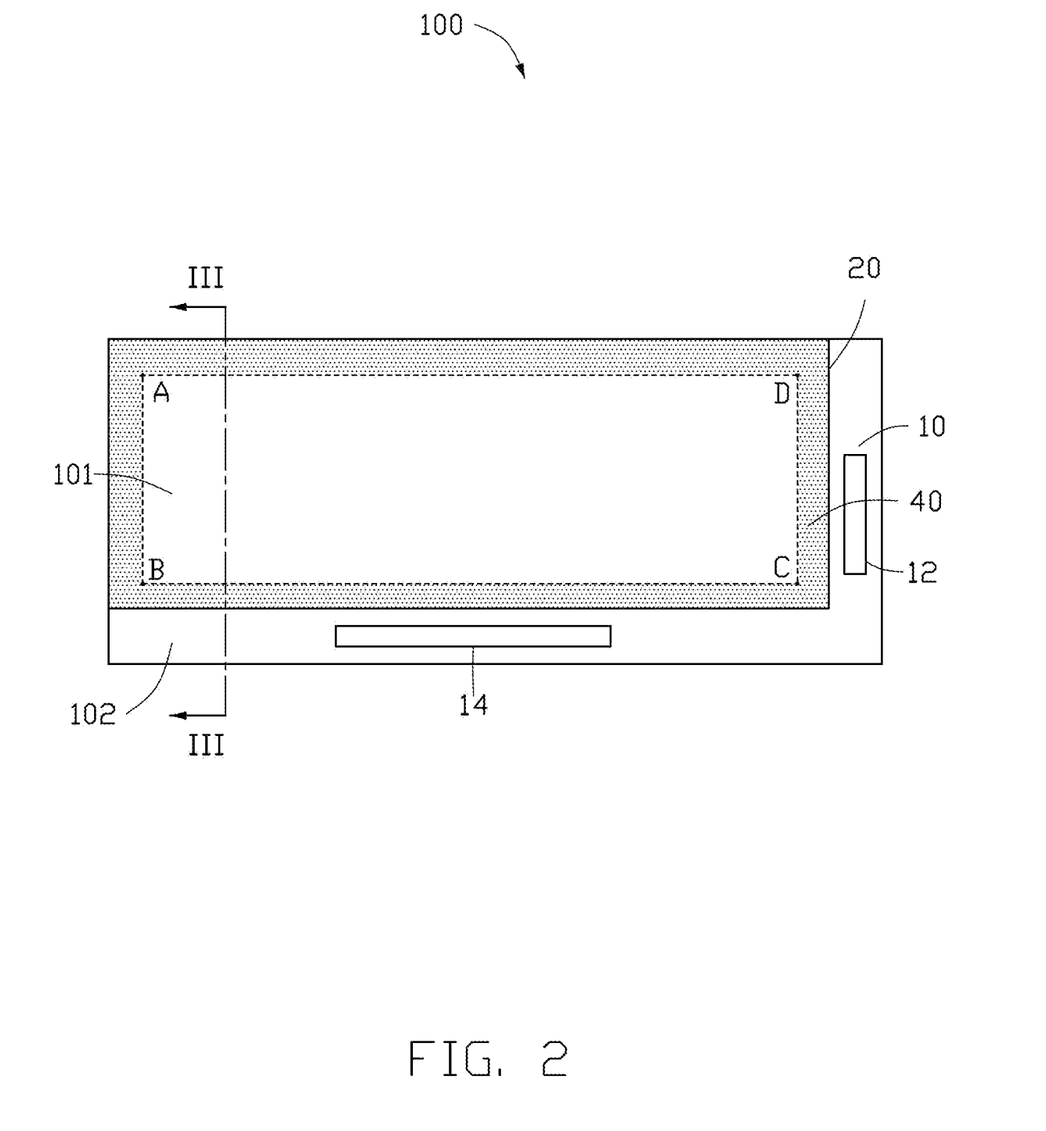
FIG. 2 is a top view of the first liquid crystal display panel provided in Block S1 of the method of FIG. 1.

As shown in FIG. 2, the first liquid crystal display panel 100 has a first display area 101 of a first size, and a first non-display area 102 surrounding the first display area 101. FIG. 2 illustrates that the first display area 101 is defined as an area enclosed by the rectangle ABCD. The first liquid crystal display panel 100 includes an array substrate 10, a color filter substrate 20 and a sealant 40. Two sides of the array substrate 10 are aligned with the color filter substrate 20, and the other two sides extend beyond the color filter substrate 20. The sealant 40 is in the first non-display area 102 and surrounds the first display area 101. The area of the array substrate 10 extending beyond the color filter substrate 20 is provided with, for example, a gate driving circuit 12 and a source driving circuit 14 for controlling the first display area 101 to display images.

Figure 3:
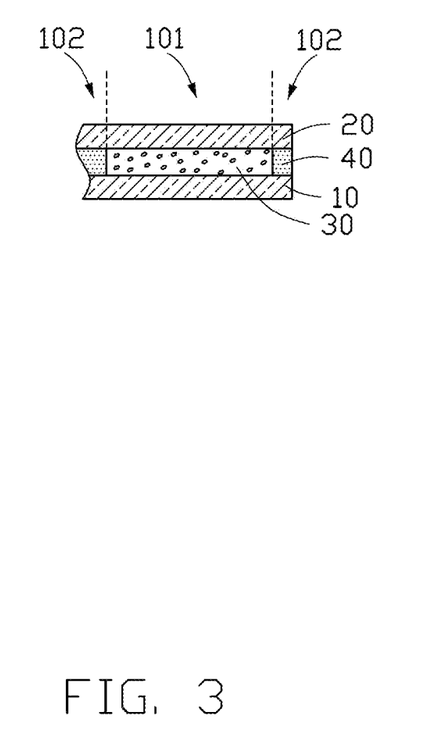
FIG. 3 is a cross-sectional view taken along line of FIG. 2.

As shown in FIGS. 2 and 3, the first liquid crystal display panel 100 includes a liquid crystal layer 30 between the array substrate 10 and the color filter substrate 20 and corresponding to the first display area 101. The sealant 40 is between the array substrate 10 and the color filter substrate 20 to maintain a thickness of the liquid crystal cell.

In Block S2, a cutting process is performed.

Figure 4:
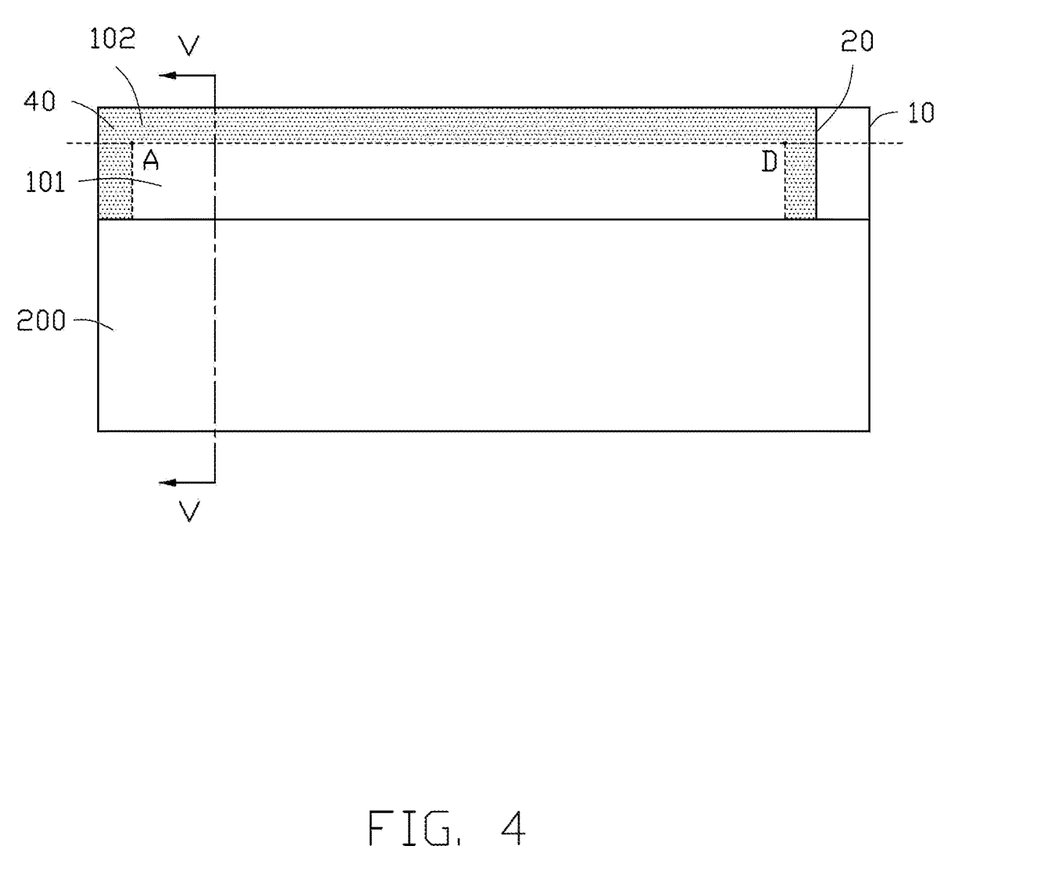
FIG. 4 is a schematic view of cutting the first liquid crystal display panel in Block S2 of the method of FIG. 1.

As shown in FIG. 4, the first liquid crystal display panel 100 is placed in a squeezing device 200. Force of gravity (vertical or gravity direction) applying to the first liquid crystal display panel 100 is perpendicular to a thickness direction of the first liquid crystal display panel 100, that is to say, the thickness can be measured horizontally. A part of the first display area 101 is exposed and another part of the first display area 101 is in the squeezing device 200.

Figure 5:
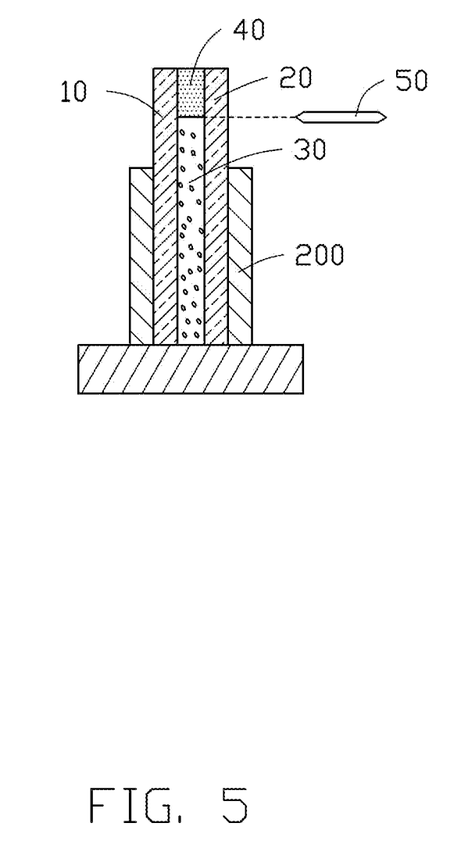
FIG. 5 is a cross-sectional view taken along line V-V of FIG. 4.

As shown in FIG. 5, the first liquid crystal display panel 100 is placed in the squeezing device 200 maintaining its gravity direction perpendicular to its thickness direction.

The squeezing device 200 squeezes opposite sides of the first liquid crystal display panel 100.

Since the first liquid crystal display panel 100 is placed vertically and is squeezed by the squeezing device 200 on opposite sides, the phenomenon that the array substrate 10 and the color filter substrate 20 are stretched to both sides due to pressure is effectively avoided when the first liquid crystal display panel 100 is in a vacuum-broken state.

As shown in FIGS. 4 and 5, a cutting tool 50 cuts the color filter substrate 20 along a dividing line (that is, line AD) between the first display area 101 and the sealant 40 (or a dividing line between the first display area 101 and the first non-display area 102). That is, the cutting tool 50 does not cut the array substrate 10.

In the cutting step, the first liquid crystal display panel 100 is placed vertically, and the cutting tool 50 cuts horizontally. Compared with the method in which the cutting tool cuts vertically, the liquid crystal is effectively controlled the and the problem of liquid crystal leakage during the cutting process is avoided.

In other embodiments, the cutting tool 50 cuts the color filter substrate 20 in the first display area 101, so that the first liquid crystal display panel 100 is in a vacuum-broken state. In addition, the cutting tool 50 does not cut the array substrate 10.

In Block S3, a squeezing process is performed.

In one embodiment, after the first liquid crystal display panel 100 is cut, the squeezing device 200 extrudes the array substrate 10 and the color filter substrate 20 to squeeze out the gas in the liquid crystal layer 30. This prevents bubbles forming in the gas in the liquid crystal layer 30, after the subsequent sealing glue is cured. At least a part of the first liquid crystal display panel 100 corresponding to the second display area 301 is squeezed by the squeezing device 200.

Figure 6:
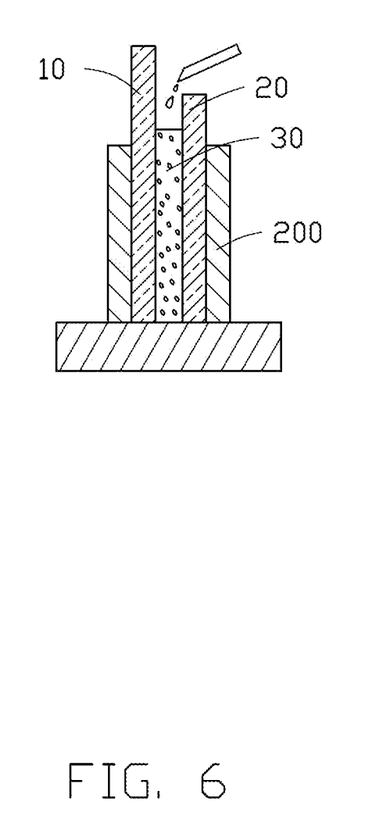
FIG. 6 is a schematic view of liquid crystals being dropped.

In one embodiment, as shown in FIG. 6, after the first liquid crystal display panel 100 is cut and squeezed, some crystal-containing liquid is lost. The method further includes injecting an appropriate amount of liquid crystal into the liquid crystal layer 30 as a "top-up", to compensate for the liquid crystal loss during cutting and squeezing.

In Block S4, a sealing and curing process is performed.

Figure 7:
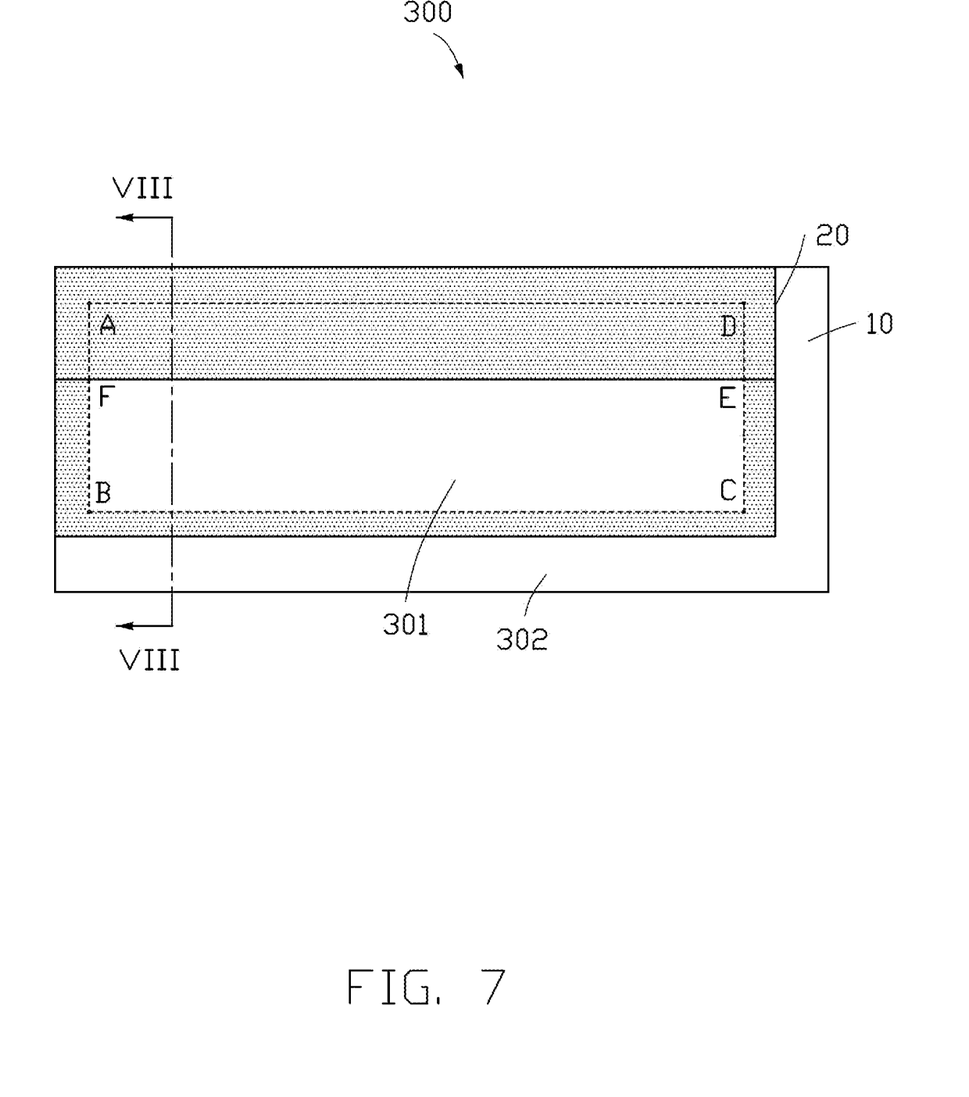
FIG. 7 is a schematic view of sealing in Block S4 of the method of FIG. 1.
Figure 8:
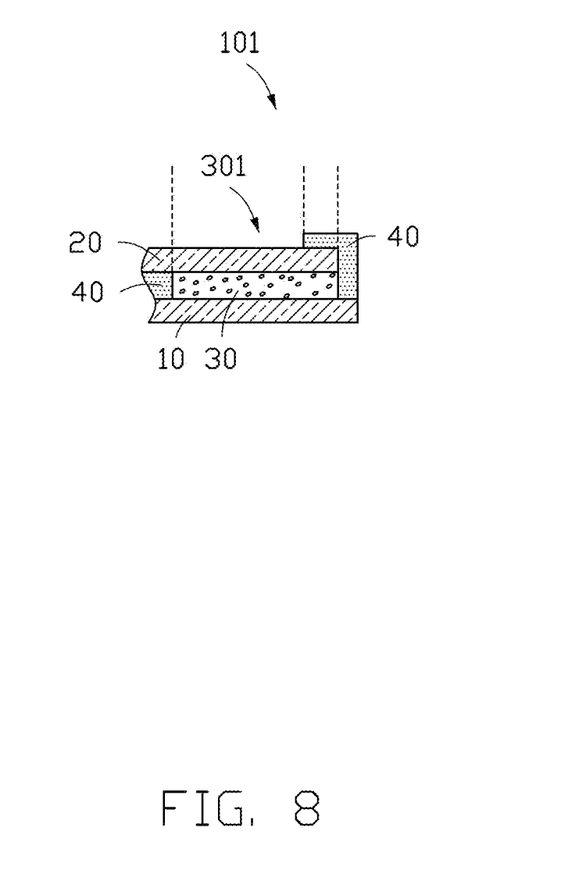
FIG. 8 is a cross-sectional view taken along line VIII-VIII of FIG. 7.

As shown in FIGS. 7 and 8, a glue applicator is used for sealing and curing to obtain a second liquid crystal display panel 300. The second liquid crystal display panel 300 has a second display area 301 of a second size. The curing may be ultraviolet (UV) curing or thermal curing.

As shown in FIG. 7, the second display area 301 is an area defined by a rectangular BCEF.

As shown in FIGS. 7 and 8, in Block S4, the sealant 40 is formed on the array substrate 10 corresponding to the cut portion of the color filter substrate 20 and extends to cover the first display area 101. That is, at least some of the sealant 40 is on the array substrate 10 and extends to cover a side of the color filter substrate 20 away from the array substrate 10, to cover a non-displaying portion of the first display area 101. A projection of the sealant 40 covers a part of the liquid crystal layer 30 along a thickness direction of the liquid crystal display panel. An area outside the second display area 301 is defined as a second non-display area 302. That is, the area outside the rectangle BCEF is the second non-display area 302.

In one embodiment, the first liquid crystal display panel 100 is originally used for a display panel with a screen resolution of 1920*1080 and is processed by being cut to obtain a liquid crystal display panel with a screen resolution of 1920*720. In FIG. 7, the screen resolution of the first display area 101 defined by ABCD is 1920*1080. By cutting and removing part of the color filter substrate 20, and making the sealant 40 cover ⅓ of the first display area 101 (that is, a length of AF is ⅓ of a length of AB), the screen resolution of the second display area 301 (the area defined by BCEF) of the second liquid crystal display panel 300 is obtained as 1920*720. That is, the LCD panel with a display size of 16:9 is changed to a display size of 16:3. That is, a length of the second display area 301 is one third of a length of the first display area 101, and a width of the second display area 301 is equal to a width of the first display area 101. In other embodiments, the screen resolution after processing is not limited. The size is not limited, for example, the display size is changed from 4:3 to 4:1.

An embodiment of the present disclosure also provides a liquid crystal display panel (i.e., the second liquid crystal display panel 300) prepared by the method, referring to FIG. 7 and FIG. 8. In the second liquid crystal display panel 300, the sealant 40 seals the liquid crystal layer 30. Some of the sealant 40 is applied between the color filter substrate 20 and the array substrate 10 to maintain an original thickness of the liquid crystal cell. Some of the sealant 40 is applied on the array substrate 10 and extends to cover the side of the color filter substrate 20 away from the array substrate 10. A projection of the sealant 40 partially covers the liquid layer 30 along a thickness direction of the liquid crystal display panel.

Figure 9:
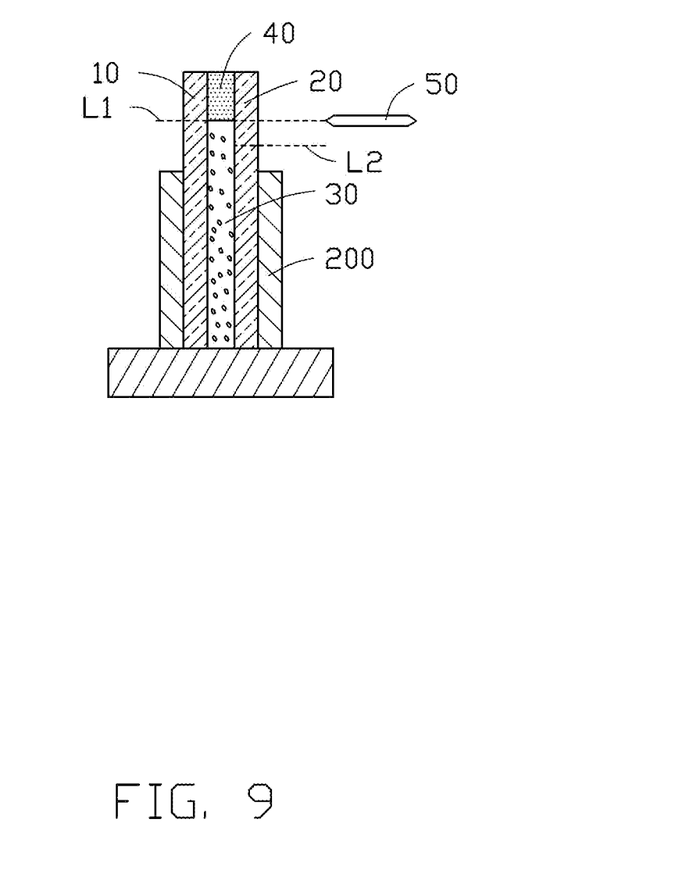
FIG. 9 is a schematic view of cutting the first liquid crystal display panel in the method of manufacturing a liquid crystal display panel of FIG. 1 according to another embodiment of the present disclosure.

In another embodiment, the cutting includes two cutting steps, the squeezing, sealing, and curing steps remain unchanged. As shown in FIG. 9, assuming a cutting precision and a coating precision of the sealant, the first cut is along a cutting line L1 (in FIG. 9, L1 is a dividing line between the first display area 101 and the first non-display area 102), and redundant portions of the array substrate 10 and the color filter substrate 20 are cut off, so that the first liquid crystal display panel 100 is in a vacuum-broken state, and a required size is obtained. That is, in the first cutting process, both the array substrate 10 and the color filter substrate 20 are cut. For the second cutting, assuming a cutting accuracy, a width of the sealant, and a coating precision of the sealant, along a cutting line L2 (in FIG. 9, the cutting line L2 is in the first display area 101), part of the color filter substrate 20 is removed. That is, the color filter substrate 20 is cut at least twice to completely cut off the excess part of the color filter substrate 20. After the first cutting, the part of the color filter substrate 20 outside the cutting line L1 is removed. After the second cutting, the part of the color filter substrate 20 between the cutting line L1 and the cutting line L2 is removed.

Figure 10:
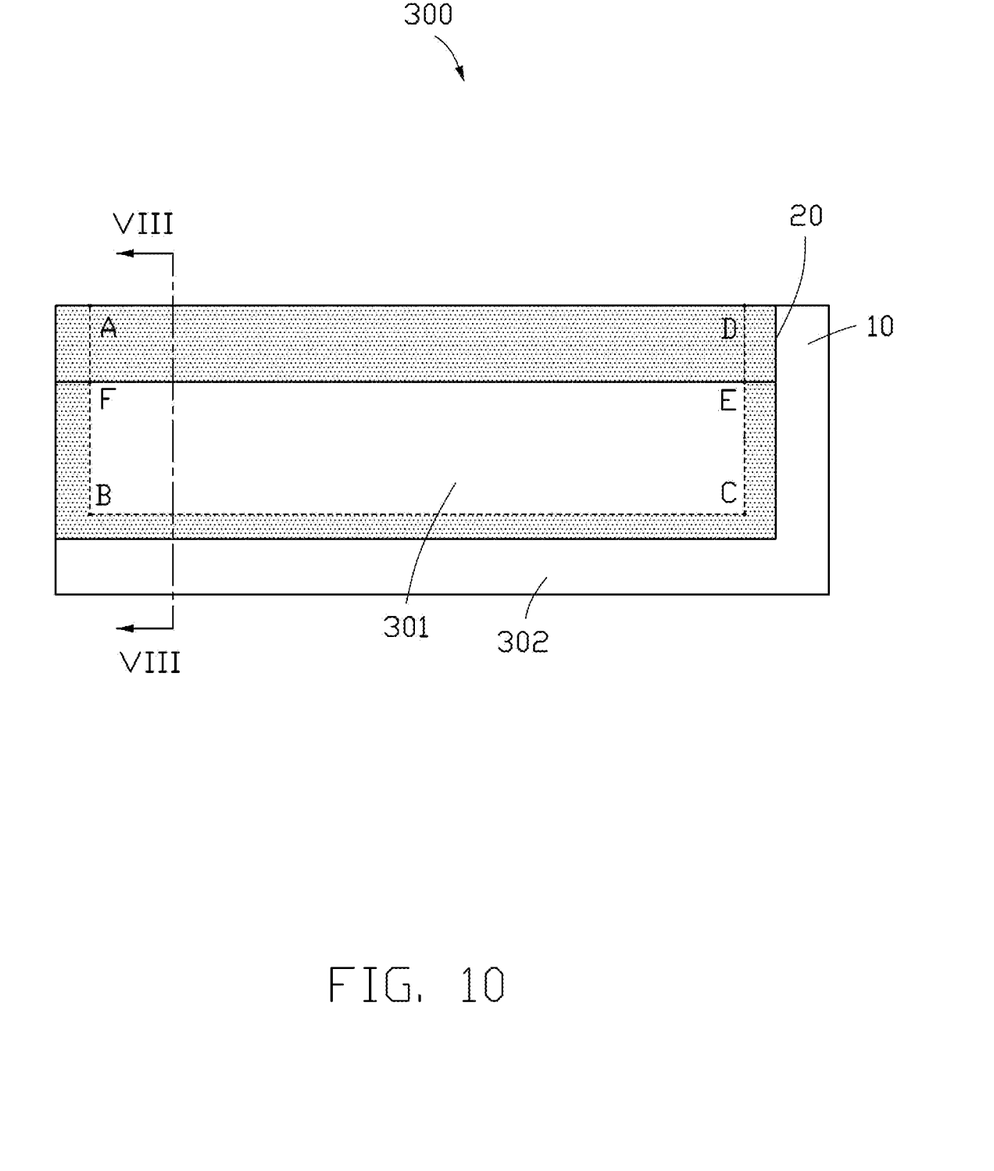
FIG. 10 is schematic view showing a second liquid crystal display panel obtained by the method of manufacturing a liquid crystal display panel of FIG. 1 according to another embodiment of the present disclosure.

After being cut twice, the first liquid crystal display panel 100 is squeezed by the squeezing device 200, further liquid crystal is injected in compensation, and the sealant is coated on the array substrate 20 in sequence. Finally, a second liquid crystal display panel 300 as shown in FIG. 10 is obtained. It can be seen from FIG. 2 and FIG. 10 that an overall size of the second liquid crystal display panel 300 is less than a size of the first liquid crystal display panel 100.

In one embodiment, the cutting line L1 is the dividing line between the first display area 101 and the first non-display area 102 (line AD in FIG. 4), so that the cutting tool 50 cuts the array substrate 10 and the color filter substrate 20 along AD, the excess part being removed after cutting. In another embodiment, the cutting line L1 is in the first display area 101. The cutting tool 50 cuts the color filter substrate 20 and the array substrate 10 in the first display area 101, so that the first liquid crystal display panel 100 is in a vacuum-broken state.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A method of manufacturing a liquid crystal display panel, comprising:
    providing a first liquid crystal display panel, the first liquid crystal display panel defining a first display area of a first size, and the first liquid crystal display panel comprising a color filter substrate, a liquid crystal layer, and an array substrate stacked in said order;
    cutting the color filter substrate so that the first liquid crystal display panel is in a vacuum-broken state;
    injecting liquid crystal in the liquid crystal layer after cutting the color filter substrate; and
    coating sealant enclosing the liquid crystal layer and extending to a side of the color filter substrate away from the array substrate to cover part of the first display area on an area of the array substrate not covered by the color filter substrate, wherein the sealant is in direct contact with the liquid crystal layer but does not extend between the array substrate and the color filter substrate, thereby obtaining a second liquid crystal display panel having a second display area of a second size, the second size being less than the first size.

2. The method of manufacturing a liquid crystal display panel of claim 1, wherein cutting the color filter substrate comprises a first cutting and a second cutting; in the first cutting, at least both the array substrate and the color filter substrate in the non-display area are removed, so that the first liquid crystal display panel is in a vacuum-broken state; and in the second cutting, part of the color filter substrate in the display area is removed.

3. The method of manufacturing a liquid crystal display panel of claim 1, wherein cutting the color filter substrate, the first liquid crystal display panel is in a squeezing device, and a gravity direction of the first liquid crystal display panel is maintained perpendicular to a thickness direction of the first liquid crystal display panel during the cutting.

4. The method of manufacturing a liquid crystal display panel of claim 3, wherein cutting the color filter substrate, a cutting tool cuts along a direction perpendicular to the gravity direction of the first liquid crystal display panel.

5. The method of manufacturing a liquid crystal display panel of claim 3, after cutting the color filter substrate, the method further comprising:
    squeezing the array substrate and the color filter substrate by the squeezing device to squeeze out gas in the liquid crystal layer.

6. The method of manufacturing a liquid crystal display panel of claim 5, wherein at least a part of the first liquid crystal display panel corresponds to the second display area is squeezed by the squeezing device.

7. The method of manufacturing a liquid crystal display panel of claim 1, wherein the first liquid crystal display panel is provided such that the array substrate has an area extending beyond the color filter substrate, a gate driving circuit and a source driving circuit are provided in the area for controlling the first display area to display images.

8. The method of manufacturing a liquid crystal display panel of claim 1, further comprising curing the sealant.

9. The method of manufacturing a liquid crystal display panel of claim 8, wherein curing the sealant by UV curing or thermal curing.

10. The method of manufacturing a liquid crystal display panel of claim 1, wherein a length of the second display area is one third of a length of the first display area, and a width of the second display area is equal to a width of the first display area.

11. The method of manufacturing a liquid crystal display panel of claim 10, wherein a screen resolution of the first display area is 1920*1080, and a screen resolution of the second display area is 1920*720.

* * * * *